Nov. 15, 1955 H. K. WILD 2,724,104
RING CHECK CIRCUIT
Filed Oct. 6, 1954 2 Sheets-Sheet 1

*INVENTOR.*
HERBERT K. WILD
BY E. Lester
AGENT

INVENTOR.
HERBERT K. WILD

United States Patent Office 2,724,104
Patented Nov. 15, 1955

2,724,104

RING CHECK CIRCUIT

Herbert K. Wild, Wappingers Falls, N. Y., assignor to International Business Machines Corporation, New York, N. Y., a corporation of New York Application October 6, 1954, Serial No. 460,628

12 Claims. (Cl. 340—213)

This invention relates to checking circuits and more particularly to an improved circuit for checking the storage condition of a ring of storage units.

Timing devices such as clock pulse generators are usually comprised of a plurality of bistable devices cascaded together to form a ring of bistable devices. The basic component of the clock pulse generator, namely, the bistable device, comprises an electronic trigger circuit having two stable states designated as the "on" or set state and the "off" or reset state. Initially, a predetermined one of the plurality of triggers in the ring is in the "on" state. When a pulse is applied to the ring of triggers, the effect is to reset the predetermined trigger to the "off" state and to set the succeeding trigger to the "on" state. Thus, in a similar manner, each succeeding pulse applied to the ring of triggers causes the trigger that is presently in the "on" state to be reset to the "off" state and the succeeding trigger to be set to the "on" state so that the "on" state steps from trigger to trigger of the ring. Accordingly, though the "on" state steps from trigger to trigger of the ring, one and only one trigger of the ring is in the "on" state at any one instant of time.

Occasionally, due to component failure or breakdown or noise signals creeping in, more than one of the triggers of the ring may be in the "on" state at one instant of time. In the copending application Serial No. 460,090, filed October 4, 1954, and assigned to the same asignee as the present application there is disclosed and claimed one type of storage checking circuit which detects whether more than one of a plurality of triggers is in the "on" condition and includes a pair of "and" and "or" circuits corresponding to each trigger in the ring except the first. This type of checking circuit while effective is subject to a disadvantage in that it requires a great deal of circuitry especially where multi stage trigger rings are utilized.

Accordingly, it is an object of this invention to provide an improved checking arrangement for detecting whether more than one of a plurality of bistable devices are in the "on" state.

Another object of the invention is to check the state of a plurality of trigger circuits with a minimum of circuitry.

Still another object of the invention is the provision of a checking circuit which produces an error indication whenever more than one of a predetermined number of triggers are in the "on" state.

In accordance with the present invention, a checking circuit is provided for a ring of bistable devices comprising a sensing means associated with a first predetermined bistable device and a timing means associated with the sensing means and a second predetermined bistable device. The timing means responds to the second predetermined bistable device being set to the "on" state to condition the sensing means for a predetermined period of time. The sensing means senses the state of the first predetermined bistable device and produces a signal if the first predetermined bistable device is set to the "on" state during the predetermined period of time. An indicator is also provided, operatively coupled to the sensing means and responsive to the signal produced thereby, for producing an indication that more than one bistable device of the ring is in the "on" state.

Other objects of the invention will be pointed out in the following description and claims and illustrated in the accompanying drawings, which disclose by way of examples, the principle of the invention and the best mode, which has been contemplated of applying that principle.

Reference is now made to the drawings and more particularly to Figs. 1 to 5, inclusive, which illustrate the schematics of the symbols hereinafter employed to simplify the detailed description of the invention.

Figure 1:
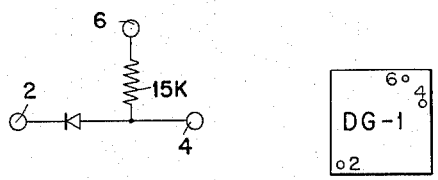
Figure 1 illustrates both the block symbol and the schematic circuit of a diode gate DG used in the invention.

Referring first to Fig. 1, there is illustrated the block symbol of a diode gate and also the details of the circuit within the block. This type of diode gate has the property of passing a negative pulse if it is positively conditioned.

The diode gate is composed of a diode and a 15K resistor. The diode includes a cathode connected to the input terminal 2 and an anode connected to the output terminal 4 and via the 15K resistor to the supply terminal 6. The input terminal 2 is normally at a relatively positive potential with respect to the potential at the supply terminal 6. Consequently, the diode is disconnected and the output terminal 4 is maintained at the potential at the supply terminal 6. If a positive signal is applied to the input terminal 2 it will have no effect on the diode gate as it merely biases the diode further to prevent conduction therethrough. If a negative signal is applied to the input terminal 2 of a magnitude which does not lower the potential at the input terminal 2 below that at the supply terminal 6 it, too, will have no effect on the diode gate as the diode will still be biased to prevent conduction therethrough. However, if a positive signal is applied to the supply terminal 6 having a magnitude such that it is relatively positive with respect to negative signals applied to the input terminal 2, then, the diode is positively conditioned and will conduct upon the application of a negative signal to the input terminal 2 to pass a negative pulse to the output terminal 4. The diode gate is hereinafter represented by a block containing the alphabetic characters DG and a numerical designation i. e. DG–1.

Figure 2:
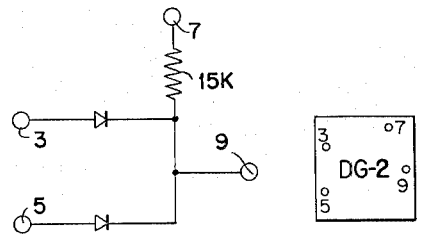
Figure 2 shows both the block symbol and the schematic circuit of another type diode gate DG used in the invention.

Referring now to Fig. 2, there is illustrated the block symbol of a different type of diode gate and also details of the circuit within the block. This type of diode gate also has the property of passing a negative pulse if it is positively conditioned.

The diode gate is composed of two diodes and a 15K resistor. The diodes include a cathode connected to the input terminals 3 and 5, respectively, and an anode connected to the output terminal 9 and via the 15K resistor to the supply terminal 7. The input terminals 3 and 5 are normally at a relatively positive potential with respect to that at the supply terminal 7. Consequently, the diodes are disconnected and the output terminal 9 is maintained at the potential at the supply terminal 7. If a positive signal or a negative signal is applied to either of the input terminals 3 and 5 of a magnitude which does not lower the potential at the input terminal below that at the supply terminal 7 it will have no effect on the diode gate as the diode will be biased to prevent conduction therethrough. However, if a positive signal is applied to and maintained at the input terminal 5 and a positive signal is applied to the supply terminal 7 having a magnitude such that it is relatively positive with respect to negative signals applied to the input terminal 3 then the diode gate is positively conditioned and the diode associated with the input terminal 3 will conduct upon the application of a negative signal to the input terminal 3 to pass a negative pulse to the output terminal 9. This type of diode gate is hereinafter represented by a block containing the alphabetic characters DG and a numerical designation i. e. DG-2.

Figure 3:
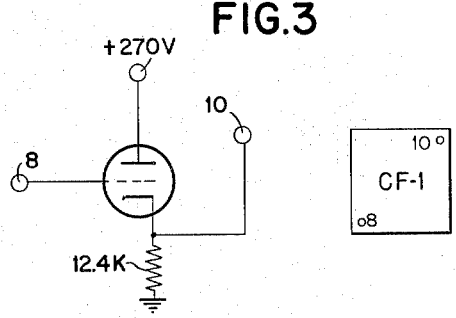
Figure 3 illustrates both the block symbol and the schematic circuit of a cathode follower CF used in the invention.

Referring now to Fig. 3 there is illustrated the block symbol of a cathode follower and also the details of the circuit within the block. The cathode follower functions as a coupling means so as to prevent loading of the signal transmitting stages.

Figure 4:
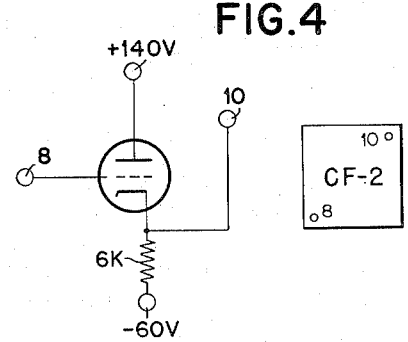
Figure 4 shows both the block symbol and the schematic circuit of another type cathode follower CF used in the invention.

The cathode follower includes a triode, of the type 5965, having a plate connected to a positive 270 volt supply bus, a grid connected to the input terminal 8 and the cathode connected to the output terminal 10 and via a 12.4K resistor to ground. The cathode follower output follows the grid input potential and hence is of the same polarity. The cathode follower is hereinafter represented by a block containing the alphabetic characters CF and a numerical designation i. e. CF-1. Figure 4 shows the block symbol of a similar cathode follower and also the details of the circuit within the block. The cathode follower shown in Figure 4 differs from that shown in Figure 3 in that the plate is connected to a positive 140 volt supply bus and the cathode is connected via a 6K resistor to a negative 60 volt supply bus.

Figure 5:
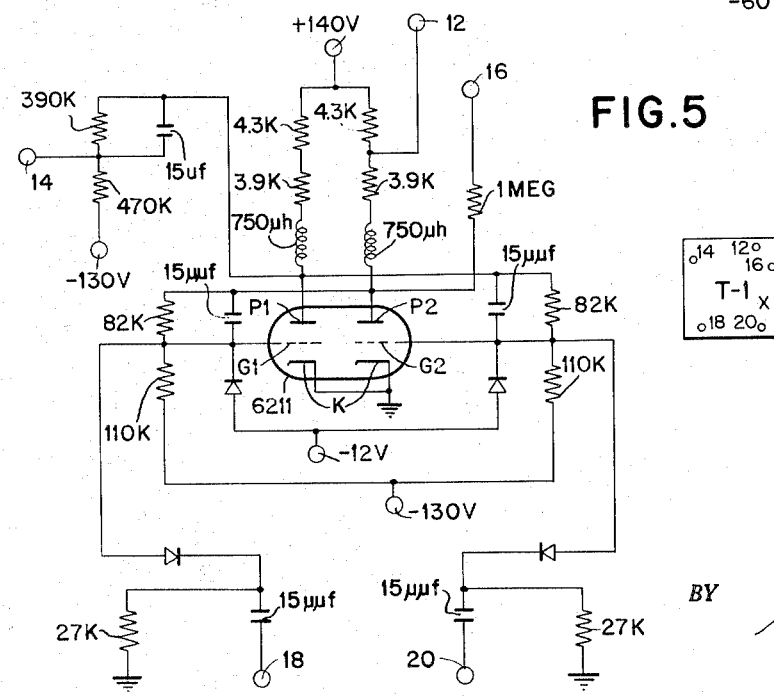
Figure 5 illustrates both the block symbol and the schematic circuit of an electronic trigger T used in the invention.

Referring now to Fig. 5 there is illustrated the block symbol of a trigger and also the details of the circuit within the block. The trigger has two states of stability for fixed values of supply potentials and circuit components. One stable state of the trigger is termed the "off" or reset state and exists when one tube is conductive while the other tube is non-conductive and the output terminal is at a relatively negative potential. The second stable state is termed the "on" or set state and exists when the tube which was previously conductive is now non-conductive while the tube which was previously non-conductive is now conductive and the output terminal is at a relatively positive potential.

The trigger comprises two cross-coupled triodes, of the type 6211, in which the plate P1 is cross-coupled via an 82K resistor to the grid G2, while the plate P2 is likewise cross-coupled to the grid G1 via an 82K resistor. Each of the 82K resistors is shunted by a 15 micro-microfarad capacitor, respective'y. Each junction of the 82K resistor and the 15 micro-microfarad capacitor is connected via a diode to a negative 12 volt supply bus and via a 110K resistor to a negative 130 volt supply bus. The cathodes K are grounded, while each of the plates P1 and P2 are connected via a 750 microhenry inductor, a 3.9K resistor and a 4.3K resistor to a positive 140 volt supply bus. The output terminal 12 is connected to the junction of the 4.3K and 3.9K resistors associated with the right triode. The first intermediate output terminal 16 is connected via a 1 meg. resistor to the plate P2. Plate P1 is connected via a 390K resistor to a second intermediate output terminal 14 and via a 470K resistor to the negative 130 volt supply bus. A 15 micro-microfarad capacitor is connected in parallel with 390K re-sistor. The reset terminal 18 and the set terminal 20 are coupled via differentiating circuits, comprising a 15 micro-microfarad capacitor and a 27K resistor, and an isolating diode to the grids G1 and G2, respectively. The isolating diodes only permit negative signals to pass to the grids G1 and G2.

If the right triode is conducting and a negative signal is applied to the set terminal 20, the right triode is cut off. If the right triode stops conducting, the voltage at the plate P2 goes positive, which voltage through the cross coupling previously described, drives the grid G1 relatively positive so that the left triode conducts and the voltage at the plate P1 goes negative, thus P2 becomes positive while P1 becomes negative. This is the first stable state of the trigger and is termed the "on" or set state. In a similar manner, with the left triode conducting, the right triode may be rendered conductive by the application of a negative signal to the reset terminal 18, whereupon the left triode stops conducting and the voltage at P1 going positive is applied via the cross coupling connection to the grid G2, causing the right triode to conduct, P2 becoming negative. This is the second stable state of the trigger and is termed the "off" or reset state. Upon shifting of the trigger from the "off" to the "on" state, there is a steep rise in potential or positive going signals at the output terminal 12 and the first intermediate output terminal 16 while there is a steep drop in potential or negative going signal at the second intermediate output terminal 14. The state of a trigger is denoted by the small letter $x$ adjacent the side at which the tube is conducting. The trigger is hereinafter represented by a block containing the alphabetic character T and a numerical designation i. e. T-1.

In a ring of triggers a single pulse cycling around the ring causing the "on" state to step from trigger to trigger of the ring in a manner as previously described. The period of time that it takes the pulse to make a complete cycle from a given point in the ring can be expressed by the formula $Kn$ where K is the duration in microseconds of the "on" state of one trigger and $n$ is the number of triggers in the ring. If two triggers in the ring are in the "on" state at the same time such that two pulses concurrently cycle the ring, then, for a ring comprising an odd number of triggers, there is a maximum period of time that it takes for the leading edges of the two pulses to pass a given point in the ring which can be expressed by the formula $$T = K\frac{(n-1)}{2}$$

Thus, to check whether more than one pulse is circulating in an odd numbered trigger ring it is necessary to sample the output of a predetermined one of the triggers in the ring to determine whether after producing one output pulse it produces another within $$K\frac{(n-1)}{2} \text{ microseconds}$$

Therefore, the checking circuit incorporates a timing device comprising a trigger whose "on" state has period equal to T microseconds. The timing device is used to partially condition a diode gate for T microseconds after the trailing edge of the first output pulse from the sampled trigger. If the sampled trigger produces another output pulse during this interval it is used to complete the conditioning of the diode gate such that it passes a negative pulse to set an indicator trigger to the "on" state, causing a neon indicator tube to glow and indicate the presence of two pulses circulating in the ring. The period of the timing device can be provided by connecting the set terminal thereof to the output of the trigger succeeding the sampled trigger, such that the leading edge of the output pulse from this trigger sets the timing trigger, and connecting the reset terminal thereof to the output of the trigger which is set T microseconds after the trigger succeeding the sampled trigger, such that the leading edge of the output pulse from this trigger resets the timing trigger. Consequently, the timing trigger will remain set to the "on" state for T microseconds. Alternatively, the timing signal can be provided by a single shot multivibrator having a period equal to T microseconds and connected to the trigger succeeding the sampled trigger.

Figure 6:
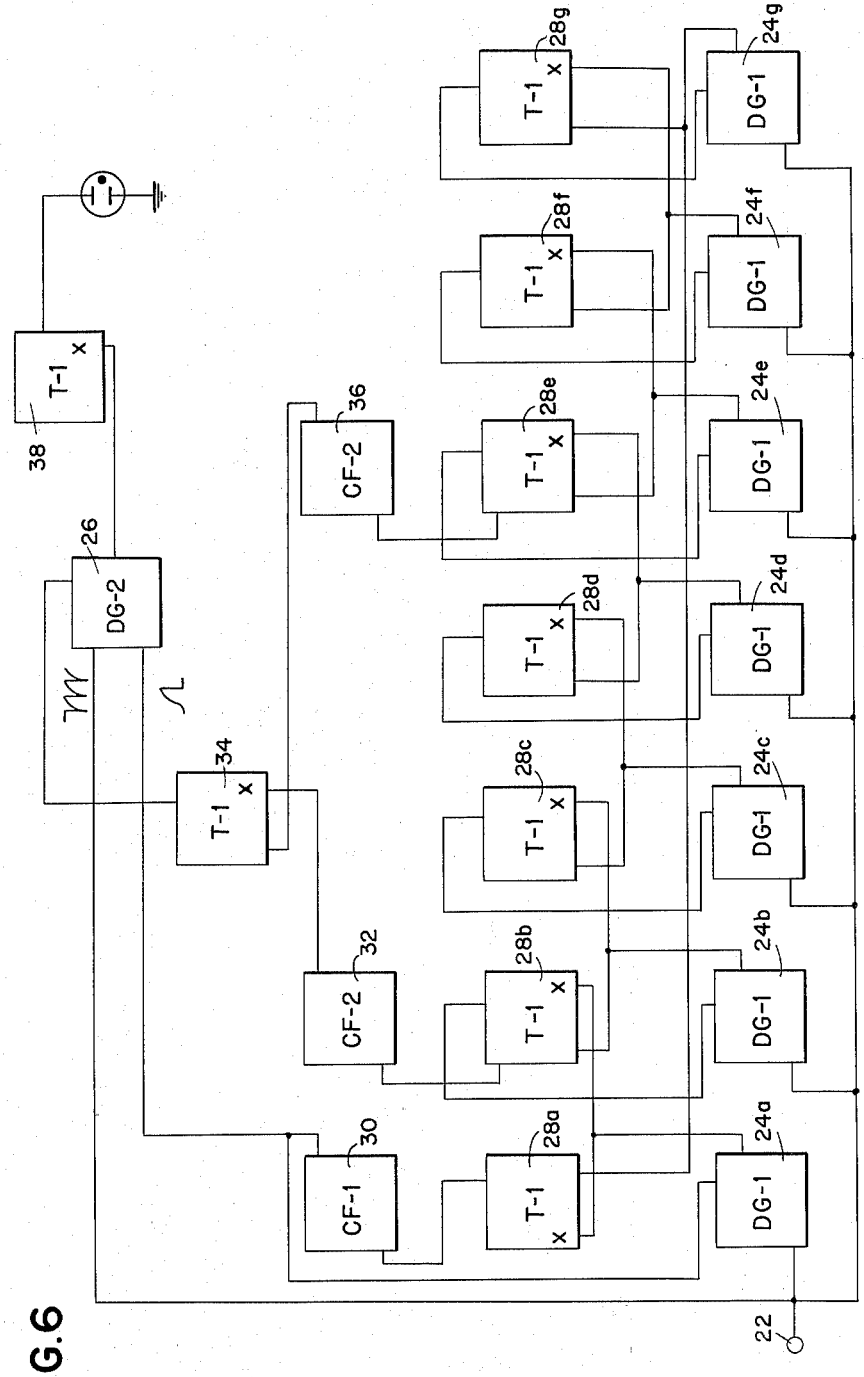
Figure 6 is a block diagram of the ring checking circuit.

Referring now to Figure 6 there is illustrated the block diagram of the ring checking circuit of the present invention for checking a ring of seven triggers.

A 1 megacycle source of negative pulses (not shown) is connected via the input terminal 22 to the input terminal 2 of the diode gates 24 and to the input terminal 3 of the diode gates 26. The output terminal 4 of each diode gate 24 is connected to the reset terminal 18 of the corresponding trigger 28 and to the set terminal 20 of the next succeeding trigger. However, the output terminal 4 of the last diode gate 24g is connected to the reset terminal 18 of the corresponding trigger 28g and to the set terminal 20 of the trigger 28a to complete the ring. The output terminal 12 of the trigger 28a is connected via the cathode follower 30 to the input terminal 5 of the diode gate 26 and to the supply terminal 6 of the diode gate 24a. The output terminal 12 of the remaining triggers 28 are connected to the supply terminal 6 of the corresponding diode gates 24. The intermediate output terminal 14 of the trigger 28b is connected via a cathode follower 32 to the set terminal 20 of the timing trigger 34. The intermediate output terminal 14 of the trigger 28e is connected via a cathode follower 36 to the reset terminal 18 of the timing trigger 34. The output terminal 12 of the timing trigger 34 is connected to the supply terminal 7 of the diode gate 26 while the output terminal 9 of the diode gate 26 is connected to the set terminal 20 of the indicator trigger 38. The intermediate output terminal 16 of the indicator trigger 38 is connected via a neon tube indicator to ground.

At the start of operation let it be assumed that the trigger 28a is set to the "on" state while triggers 28b to 28g, inclusive, and triggers 34 and 38 are in the reset or "off" state as shown in Figure 6. The reset circuit is not shown but the setting of the triggers may be accomplished by any one of several well known means, for example, by delaying the application of the negative bias to the left grid of the trigger 28a and to the right grid of the remaining triggers. Since the trigger 28a is in the "on" state, the output terminal 12 thereof is at a positive potential causing a positive potential to be maintained, via cathode follower 30, at the input terminal 5 of the diode gate 26 and at the supply terminal 6 of the diode gate 24a. Since the timing trigger 34 is initially in the "off" state the output terminal 12 thereof is at a negative potential causing a negative potential to be maintained at the supply terminal 7 of the diode gate 26. In order to pass a negative pulse to the indicator trigger 38 the diode gate 26 requires two conditioning signals, namely, positive potentials at the supply terminal 7 and the input terminal 5, respectively. Thus, since only one of the required conditions, namely, a positive potential at the input terminal 5, exists at the start of operation, the diode gate 26 is in a deconditioned state. The output terminal 12 of the remaining triggers 28 is at a negative potential thereby maintaining a negative potential at the supply terminal 6 of the corresponding diode gates 24.

The first negative pulse applied to the input terminal 22 is passed to the diode gates 24 and to the diode gate 26. The diode gate 24a being the only gate positively conditioned will pass the negative pulse to reset the trigger 28a to the "off" state and set the trigger 28b to the "on" state. Since the diode gate 26 is in a deconditioned state the first negative pulse will not pass therethrough. The trigger 28a being reset applies a negative signal to the input terminal 5 of the diode gate 26 and to the supply terminal 6 of the diode gate 24a to decondition it. The trigger 28b being set to the "on" state applies a positive signal to the supply terminal 6 of the diode gate 26b to positively condition it and a negative signal, via the cathode follower 32, to set the timing trigger 34 to the "on" state. The timing trigger 34 being set to the "on" state, applies a positive signal to the supply terminal 7 of the diode gate 26. However, since the input terminal 5 of the diode gate 26 is now at a negative potential it remains in a deconditioned state. The second negative pulse applied to the input terminal 22 is passed via the positively conditioned diode gate 24b to reset the trigger 28b to the "off" state and to set the trigger 28c to the "on" state. In a similar manner, each succeeding negative pulse applied to the input terminal 22 steps the "on" state down the ring of triggers.

When the fourth negative pulse is applied to the input terminal 22 it is passed via the positively conditioned diode gate 24d to set the trigger 28e to the "on" state, thereby causing a negative signal to be passed via the cathode follower 36 to reset the timing trigger 34 to the "off" state. In so doing, the timing trigger 34 applies a negative signal to the supply terminal 7 of the diode gate 26 to thereby maintain the diode gate 26 in a deconditioned state.

Thus, it is evident that a single pulse circulating in the ring will never permit the diode gate 26 to meet the two required conditions to pass a negative pulse to the indicator trigger 38 as it will always be in a deconditioned state when a positive signal is produced by the first trigger 28a. However, if the first trigger 28a had been set to the "on" state during the interval that the timing trigger 34 was set to the "on" state (due to the trigger 28b being set to the "on" state) the diode gate 26 would have been positively conditioned such that a negative pulse applied to the input terminal 22 would be passed by the diode gate 26 to set the indicator trigger 38 to the "on" state, thereby causing the neon tube indicator to glow and indicate that more than one trigger of the ring was in the "on" state.

To illustrate the operation of the ring checking circuit when two concurrent pulses are stepping around the ring let it be assumed that the first and fourth triggers of the seven trigger ring are initially in the "on" state. The following table illustrates the step by step operation of the ring during one complete ring cycle when two concurrent pulses, which are separated by the maximum period of time, are stepping around the ring.

TRIGGER

| Step | 1 | 2 | 3 | 4 | 5 | 6 | 7 |
|---|---|---|---|---|---|---|---|
| 0 | X |   |   | Y |   |   |   |
| 1 |   | X |   |   | Y |   |   |
| 2 |   |   | X |   |   | Y |   |
| 3 |   |   |   | X |   |   | Y |
| 4 | Y |   |   |   | X |   |   |
| 5 |   | Y |   |   |   | X |   |
| 6 |   |   | Y |   |   |   | X |
| 7 | X |   |   | Y |   |   |   |

The operation of the ring checking circuit will now be described during each step of the ring over one complete ring cycle.

Step 0

Trigger 28a causes a positive potential to be maintained, via cathode follower 30, at the supply terminal 6 of the diode gate 24a to positively condition it and at the input terminal 5 of the diode gate 26 to fulfill one of the requirements thereof. Timing trigger 34 being in a reset state maintains a negative potential at the supply terminal 7 of the diode gate 26 thereby causing the diode gate 26 to be in a deconditioned state. Trigger 28d causes a positive potential to be maintained at the supply terminal 6 of the diode gate 24d to thereby positively condition it.

Step 1

The first negative pulse applied to the input terminal 22 is passed via the positively conditioned diode gates 24a and 24d to reset trigger 28a and set trigger 28b to the "on" state and to reset trigger 28d and set trigger 28e to the "on" state, respectively. In so doing, triggers 28a and 28d decondition the diode gates 24a and 24d, respectively, while the triggers 28b and 28e positively condition diode gates 24b and 24e, respectively. Additionally, trigger 28b and 28e apply negative signals, via the cathode followers 32 and 36, to the set and reset terminals 18 and 20 of the timing trigger 34. Since the timing trigger 34 is initially in the reset state the negative signal due to the ring trigger 28e has no effect thereon while the negative signal due to the ring trigger 28b sets the timing trigger 34 to the "on" state causing a positive signal to be applied to the supply terminal 7 of the diode gate 26. However, trigger 28a causes a negative signal to be maintained at the input terminal 5 of the diode gate 26 thereby causing the diode gate 26 to remain in a deconditioned state. Further, since $T = 3$ microseconds, according to the assumed conditions of $K = 1$ and $n = 7$, a positive potential is maintained at the supply terminal 7 of the diode gate 26 for a period of three microseconds.

Step 2

The second negative pulse applied to the input terminal 22 is passed via the positively conditioned diode gates 24b and 24e to reset trigger 28b and set 28c to the "on" state and to reset trigger 28e and set the trigger 28f to the "on" state, respectively. In so doing, triggers 28b and 28e decondition the diode gates 24b and 24e respectively while triggers 28c and 28f positively condition diode gates 24c and 24f, respectively. No change in the ring checking circuit occurs during this step.

Step 3

The third negative pulse applied to the input terminal 22 is passed via the positively conditioned diode gates 24c and 24f to reset trigger 28c and set trigger 28d to the "on" state and to reset trigger 28f and to set the trigger 28g to the "on" state, respectively. In so doing, triggers 28c and 28f decondition the diode gates 24c and 24f, respectively, while triggers 28d and 28g positively condition the diode gates 24d and 24g, respectively. No change in the ring checking circuit occurs during this step.

Step 4

The fourth negative pulse applied to the input terminal 22 is passed via the positively conditioned diode gates 24d and 24g to reset the trigger 28d and set trigger 28e to the "on" state and to reset trigger 28g and to set trigger 28a to the "on" state, respectively. In so doing, triggers 28d and 28g decondition the diode gates 24d and 24g, respectively, while triggers 28e and 28a positively condition diode gates 24e and 24a, respectively. Triggers 28a and 28e also apply negative signals via cathode followers 30 and 36, to the input terminal 5 of the diode gate 26 and to reset the timing trigger 34 which was set three microseconds ago. Consequently, due to the relative timing between the timing trigger 34 and the ring trigger 28a, the timing trigger 34 applies a negative signal to the supply terminal 7 of the diode gate 26 while the ring trigger 28a applies a positive pulse to the input terminal 5 of the diode gate 26. Therefore, the diode gate 26 is deconditioned, before the next negative pulse is applied to the input terminal 3 of the diode gate 26, to prevent the next negative pulse from passing therethrough.

Step 5

The fifth negative pulse applied to the input terminal 22 is passed via the positively conditioned diode gates 24a and 24e to reset trigger 28a and set trigger 28b to the "on" state and to reset trigger 28e and set trigger 28f to the "on" state, respectively. In so doing, triggers 28a and 28e decondition the diode gates 24a and 24e, respectively, while triggers 28b and 28f positively condition diode gates 24b and 24f, respectively. Additionally, ring trigger 28b applies a pulse, via the cathode follower 32, to set the timing trigger 34 to the "on" state and thereby maintain a positive potential at the supply terminal 7 of the diode gate 26 for a period of three microseconds. However, trigger 28a causes a negative signal to be maintained at the input terminal 5 of the diode gate 26 thereby causing the diode gate 26 to be in a deconditioned state.

Step 6

The sixth negative pulse applied to the input terminal 22 is passed via the positively conditioned diode gates 24b and 24f to reset trigger 28b and to set trigger 28c to the "on" state and to reset trigger 28f and to set trigger 28g to the "on" state, respectively. In so doing, triggers 28b and 24f decondition the diode gates 24b and 24f, respectively, while triggers 28c and 28g positively condition diode gates 24c and 28g, respectively. No change in the ring checking circuit occurs during this step.

Step 7

The seventh negative pulse applied to the input terminal 22 is passed via the positively conditioned diode gates 24c and 24g to reset trigger 28c and set trigger 28d to the "on" state and to reset trigger 28g and set trigger 28a to the "on" state, respectively. In so doing, trigger 28a applies a positive pulse, via the cathode follower 30, to the input terminal 5 of the diode gate 26. The two requirements necessary for the diode gate 26 to pass negative pulses being now fulfilled the diode gate 26 passes the next negative pulse applied to the input terminal 22 to set the indicating trigger 38 to the "on" state. In so doing, the indicating trigger 38 causes the neon tube to be operated to provide a visual indication that two pulses are cycling in the ring. After correcting the situation the indicator trigger 38 is reset to its normal state.

It should be apparent from the above operation that at the time the sampled ring trigger 28a is first set by the X pulse, the Y pulse lags the X pulse and requires four microseconds to next set the sampled ring trigger 28a. However, the second time the sampled ring trigger is set by the Y pulse, the X pulse lags the Y pulse and requires three microseconds to next set the sampled ring trigger 28a. Consequently, since two passes are made in one complete ring cycle the longer separation period of the two pulses may be discounted and the sampled ring trigger 28a need only be sampled for three microseconds. Therefore, under the assumed condition that the first and fourth ring triggers 28a and 28d are initially in the "on" state, this is the maximum period of time the ring trigger 28a need be sampled to detect the presence of a second pulse circulating in a ring and is in accord with the period expressed by the formula $$T = K\frac{(n-1)}{2}$$

Thus, there has been described herein a novel and improved ring checking circuit whereby a ring of triggers may be checked to determine if more than one trigger is in the "on" state. Further, it should be obvious, if more than two pulses are circulating in the ring that this does not deter from the operation of the circuit as the time that the timing trigger remains in an "on" state merely depends on the distribution of the pulses.

While there have been shown and described and pointed out the fundamental novel features of the invention as applied to a preferred embodiment, it will be understood that various omissions and substitutions and changes in the form and details of the device illustrated and in its operations may be made by those skilled in the art, without departing from the spirit of the invention. It is the intention, therefore, to be limited only by the scope of the following claims.

What is claimed is:

1. A checking circuit for a plurality of storage units each of which is capable of storing an information item comprising means for sensing the storage condition of a first predetermined one of said storage units, a control means associated with said storage units and rendered effective when a second predetermined one of said storage units has an information item stored therein for conditioning said sensing means for a predetermined period of time, said sensing means being effective to produce a signal if an information item is stored in said first predetermined storage unit during the predetermined period of time, and means operatively coupled to said sensing means and responsive to the signal produced thereby to produce an indication that more than one of said plurality of storage units has an information item stored therein.

2. A checking circuit for a ring of bistable units comprising means for sensing the storage condition of a first predetermined one of said bistable units, a control means associated with said bistable ring and rendered effective when a second predetermined one of said bistable units is set to an "on" state for conditioning said sensing means for a predetermined period of time, said sensing means being effective to produce a signal if said first predetermined bistable unit is set to the "on" state during the predetermined period of time, and means operatively coupled to said sensing means and responsive to the signal produced thereby for producing an indication that more than one of said ring bistable units is in an "on" state.

3. A checking circuit for a ring of storage units comprising means for sensing the output of a predetermined one of said ring storage units, a control means associated with said ring of storage units for conditioning said sensing means for a predetermined period of time after a first output signal is produced by said predetermined storage unit, said sensing means being effective to produce a signal if a second output signal is sensed during the predetermined period of time, and means operatively coupled to said sensing means and responsive to the signal produced thereby for producing an indication that more than one signal is circulating in the storage unit ring.

4. A checking circuit for a ring of storage units comprising means for sensing the output of a first predetermined one of said ring storage units, a control means coupled to the ring storage unit next succeeding said first predetermined storage unit and to a second succeeding predetermined one of said ring storage units for conditioning said sensing means for a predetermined period of time after a first output signal produced by said first predetermined ring storage unit, said sensing means being effective to produce a signal if a second output signal is sensed during the predetermined period of time, and means operatively coupled to said sensing means and responsive to the signal produced thereby to produce an indication that more than one signal is cycling in the storage unit ring.

5. A checking circuit for a ring of bistable units comprising a gate means for sensing the output of a first predetermined one of said ring bistable units, a timing means coupled to the ring bistable unit next succeeding said predetermined one of said ring bistable units for conditioning said gate means for a predetermined period of time after a first output signal is produced by said first predetermined ring bistable unit, said gate means being effective to produce a signal if a second output signal is sensed during the predetermined period of time, and an indicator operatively coupled to said gate means and responsive to the signal produced thereby for producing an indication that more than one signal is cycling in the ring of bistable units.

6. A checking circuit for a ring of bistable units comprising a gate means for sensing the output of a first predetermined one of said ring bistable units, a timing bistable unit coupled to the ring bistable unit next succeeding said predetermined one of said ring bistable units for conditioning said gate means for a predetermined period of time after a first output signal is produced by said first predetermined ring bistable unit, said gate means being effective to produce a signal if a second output signal is sensed during the predetermined period of time, and an indicator operatively coupled to said gate means and responsive to the signal produced thereby to produce an indication that more than one signal is concurrently cycling in the ring of bistable units.

7. A checking circuit for a ring of triggers comprising a diode gate for sensing the output of a first predetermined one of said ring triggers, a timing trigger coupled to the ring trigger next succeeding said predetermined one of said ring triggers for conditioning said diode gate for a predetermined period of time after a first output signal is produced by said first predetermined ring trigger, said diode gate being effective to produce a signal if a second output signal is sensed during the predetermined period of time, an indicator trigger operatively coupled to said diode gate, and a neon tube indicator connected to said indicator trigger, said indicator trigger being responsive to the signal produced by said diode gate for rendering said neon tube indicator effective to produce an indication that more than one signal is concurrently circulating in the trigger ring.

8. A checking circuit for a ring of bistable devices comprising a timing unit coupled to a first and second succeeding predetermined ones of said ring bistable devices such that said timing unit is rendered effective for a T period of time, a sensing means coupled to said timing unit for sensing the output of the ring bistable device next preceding said first predetermined ring bistable device, said timing unit being effective to condition said sensing means for a T period of time after a first output pulse from said last mentioned ring bistable device such that said sensing means is effective to produce a signal if a second output pulse is sensed during the T period of time, and means operatively coupled to said sensing means and responsive to the signal produced thereby to provide an indication that more than one pulse is circulating in the bistable ring.

9. A checking circuit for a ring of $n$ bistable devices having a ring cycle period equal to $Kn$, where K is the duration in time of the "on" state of one ring bistable device and $n$ is an odd number, comprising a timing means coupled to a first and second succeeding predetermined ones of said ring bistable devices such that said timing means is set for a period of time T equal to $$K\frac{(n-1)}{2}$$

where T is the maximum period of time it takes for the leading edges of two signals to pass the ring bistable device next preceding said first predetermined bistable device, a sensing means coupled to said timing means and said last mentioned ring bistable device, said timing means being effective to condition said sensing means for a T period of time after the trailing edge of a first output signal from said last mentioned ring bistable device, said conditioned sensing means sensing the output of said last mentioned ring bistable device and being effective to produce a negative signal if a second output signal is sensed during the T period of time, and means operatively coupled to said sensing means and responsive to the negative signal produced thereby to provide an indication that more than one pulse is circulating in the bistable ring.

10. A checking circuit for a ring of $n$ triggers having a ring cycle period equal to $Kn$, where K is the duration in time of the "on" state of one ring trigger and $n$ is an odd number, comprising a source of negative pulses, a timing trigger having set and reset terminals, said set terminal being coupled to a first predetermined one of said ring triggers while said reset terminal is coupled to a second succeeding predetermined one of said ring triggers such that said timing trigger is set to the "on" state for a period of time T equal to $$K\frac{(n-1)}{2}$$

where T is the maximum period of time it takes for the leading edges of two pulses to pass the ring trigger next preceding said first predetermined ring trigger, a sensing means coupled to said timing trigger, said last mentioned ring trigger and said source of negative pulses, said timing trigger being effective to partially condition said sensing means for a T period of time after the trailing edge of a first output pulse from said last mentioned ring trigger, said partially conditioned sensing means sensing the output of said last mentioned ring trigger and being positively conditioned to pass a negative pulse from said source of negative pulses if a second output pulse is sensed during the T period of time, and means operatively coupled to said sensing means and responsive to the negative pulse passed thereby for indicating when more than one pulse is circulating in the trigger ring.

11. A checking circuit for a ring of $n$ triggers having a ring cycle period equal to $Kn$, where K is the duration in time of the "on" state of one ring trigger and $n$ is an odd number, comprising a source of negative pulses, a timing trigger having set and reset terminals, said set terminal being coupled to a first predetermined one of said ring triggers while said reset terminal is coupled to a second succeeding predetermined one of said ring triggers such that said timing trigger is set to the "on" state for a period of time T equal to $$K\frac{(n-1)}{2}$$

where T is the maximum period of time it takes for the leading edges of two pulses to pass the ring trigger next preceding said first predetermined ring trigger, a gate means coupled to said timing trigger, said last mentioned ring trigger and said source of negative pulses, said timing trigger being effective to partially condition said gate means for a T period of time after the trailing edge of a first output pulse from said last mentioned ring trigger, said partially conditioned gate means sensing the output of said last mentioned ring trigger and being positively conditioned to pass a negative pulse from said source of negative pulses if a second output pulse is sensed during the T period of time, and an indicator being operatively coupled to said gate means and responsive to the negative pulse passed thereby for producing an indication whenever more than one pulse is cycling in the trigger ring.

12. A checking circuit for a ring of $n$ triggers having a ring cycle period equal to $Kn$, where K is the duration in time of the "on" state of one ring trigger and $n$ is an odd number, comprising a source of negative pulses, a timing trigger having set and reset terminals, said set terminal being coupled to a first predetermined one of said triggers while said reset terminal is coupled to a second succeeding predetermined one of said ring triggers such that said timing trigger is set to the "on" state for a period of time T equal to $$K\frac{(n-1)}{2}$$

where T is the maximum period of time it takes for the leading edges of two pulses to pass the ring trigger next preceding said first predetermined ring trigger, a diode gate coupled to said timing trigger, said last mentioned ring trigger and said source of negative pulses, said timing trigger being effective to partially condition said diode gate for a T period of time after the trailing edge of a first output pulse from said last mentioned ring trigger, said partially conditioned diode gate sensing the output of said last mentioned ring trigger and being positively conditioned to pass a negative pulse from said source of negative pulses if a second output pulse is sensed during the T period of time, an indicator trigger and a neon tube associated therewith, said indicator trigger being operatively coupled to said diode gate and responsive to the negative pulse thereby for rendering said neon tube effective to provide a visual indication that two pulses are concurrently cycling in the trigger ring.

References Cited in the file of this patent

UNITED STATES PATENTS

| | | |
|---|---|---|
| 1,972,985 | Gardner | Sept. 11, 1934 |
| 2,557,964 | Herbst | June 26, 1951 |
| 2,674,727 | Spielberg | Apr. 6, 1954 |
| 2,696,599 | Holbrook et al. | Dec. 7, 1954 |